(12) United States Patent
Collins (10) Patent No.: US 11,698,433 B2
(45) Date of Patent: Jul. 11, 2023

(54) ACOUSTIC VECTOR SENSOR

(71) Applicant: Raytheon BBN Technologies Corp., Cambridge, MA (US)

(72) Inventor: Jameson John Collins, Warwick, RI (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 17/881,341

(22) Filed: Aug. 4, 2022

(65) Prior Publication Data

US 2022/0373632 A1  Nov. 24, 2022

Related U.S. Application Data

(63) Continuation of application No. 16/844,343, filed on Apr. 9, 2020, now Pat. No. 11,435,428.

(51) Int. Cl.
*G01S 3/802* (2006.01)
*G01N 29/04* (2006.01)
*G01N 29/44* (2006.01)
*G01S 3/801* (2006.01)
*G01S 3/805* (2006.01)

(52) U.S. Cl.
CPC .......... *G01S 3/8027* (2013.01); *G01N 29/04* (2013.01); *G01N 29/44* (2013.01); *G01S 3/801* (2013.01); *G01S 3/805* (2013.01)

(58) Field of Classification Search
CPC ........ G01S 3/8027; G01S 3/801; G01S 3/805; G01N 29/04; G01N 29/44; G01H 3/125; G01H 11/02; H04R 1/38; H04R 3/00; H04R 23/008
See application file for complete search history.

(56) References Cited

U.S. PATENT DOCUMENTS

| 4,585,282 | A | 4/1986 | Bosley |
| 8,638,956 | B2 | 1/2014 | Deng |
| 11,435,428 | B2 * | 9/2022 | Collins ................. G01S 3/8027 |

(Continued)

FOREIGN PATENT DOCUMENTS

| AU | 2021254019 A1 * | 5/2022 | ............. G01N 29/04 |
| CA | 3173619 A1 * | 10/2021 | ............. G01N 29/04 |

(Continued)

OTHER PUBLICATIONS

International Search Report and Written Opinion in International Patent Application No. PCT/US2021/017243 dated May 26, 2021.

(Continued)

*Primary Examiner* — Daniel Pihulic
(74) *Attorney, Agent, or Firm* — Lando & Anastasi, LLP (57) ABSTRACT

An acoustic vector sensor and a method of detecting an acoustic vector are described. An object suspended in the fluid medium by a non-contact support structure. The object and the non-contact support structure are configured so that the object moves in response to any disturbance of the fluid by an acoustic wave; The non-contact support structure of the object comprises a plurality of solenoids that each produce a magnetic field in a fluid medium. A measurement measures movement of the object. A processing device determines an acoustic intensity vector of the acoustic wave based on the measured movement of the object.

16 Claims, 7 Drawing Sheets

(56) References Cited

U.S. PATENT DOCUMENTS

| | | |
|---|---|---|
| 2004/0244492 A1 | 12/2004 | Berstis |
| 2011/0033062 A1 | 2/2011 | Deng |
| 2021/0318406 A1* | 10/2021 | Collins ................. G01S 3/801 |
| 2022/0373632 A1* | 11/2022 | Collins ................. G01N 29/44 |

FOREIGN PATENT DOCUMENTS

| | | | |
|---|---|---|---|
| CN | 200962056 Y | 10/2007 | |
| WO | 8911636 A1 | 11/1989 | |
| WO | 2021206798 A1 | 10/2021 | |
| WO | WO-2021206798 A1 * | 10/2021 | ............ G01N 29/04 |
| WO | WO-2021206798 A8 * | 3/2022 | ............ G01N 29/04 |

OTHER PUBLICATIONS

J. A McConnella, "Analysis of a compliantly suspended acoustic velocity sensor," Acoustical Society of America, (2003) pp. 1395-1405.

J. M. Kendall, C. B. Leslie and J. L. Jones, "Hydrophone for Measuring Particle Velocity," Acoustical Society of America,(1956), pp. 711-715.

L. Williams, "Electromagnetic Levitation Thesis," (2005) pp. 1-64.

W. Brisley and B. S. Thornton, "Electromagnetic levitation calculations for axially symmetric systems," British Journal of Applied Physics, (1963) vol. 14, pp. 682-686.

\* cited by examiner

ACOUSTIC VECTOR SENSOR

CROSS-REFERENCE TO RELATED APPLICATIONS

This application is a continuation of U.S. patent application Ser. No. 16/844,343, filed Apr. 9, 2020.

BACKGROUND

1. Field of Invention

Embodiments of the invention relate generally to an acoustic vector sensors and more particularly to acoustic vector sensors having a non-contact support structure.

2. Discussion of Related Art

Acoustic or sound intensity is a function of acoustic pressure and acoustic particle velocity. In measuring an acoustic intensity vector of an acoustic field, it is necessary to determine the instantaneous acoustic pressure and the component of instantaneous acoustic particle velocity in the direction of interest. Once these components are known, the acoustic intensity vector can be calculated.

Figure 1:
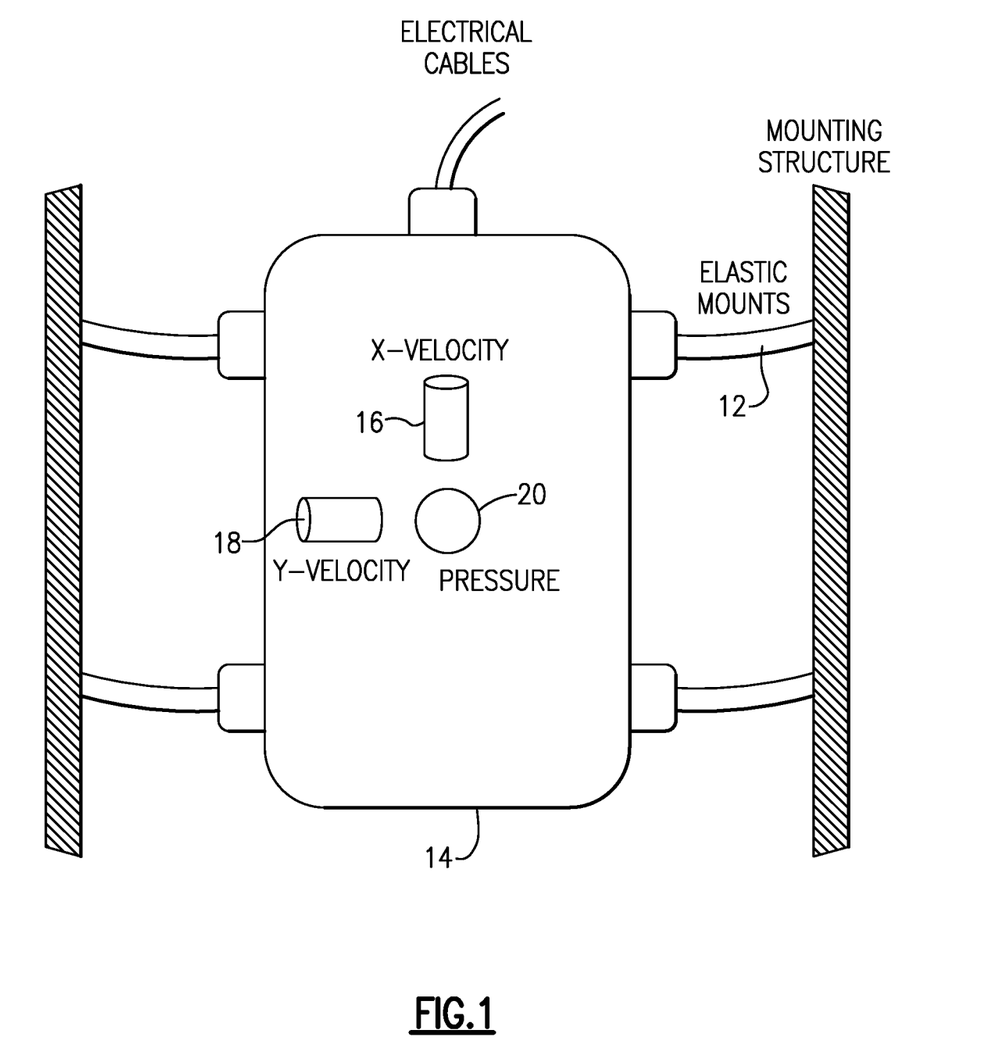
FIG. 1 illustrates an acoustic vector sensor according to the related art.

Acoustic vector sensors are devices which measure, or estimate, the acoustic intensity vector. A method of measuring the intensity vector is to measure both pressure and the instantaneous acoustic particle velocity vector of the medium's particles. The pressure multiplied by the velocity vector is the acoustic intensity vector. This vector has unambiguous direction which allows a single acoustic vector sensor to determine the arrival angle of an acoustic wave without the use of an array of sensors as is required with known pressure-only based sensing systems. Sensors of this type are called 'TU' sensors. There are many known apparatus for measuring the instantaneous acoustic particle velocity. One such apparatus is Shown in FIG. 1. The apparatus includes elastic mounts, i.e. compliant springs, 12 that compliantly suspend device 14 in a fluid medium so as to be free to move in response to a disturbance by acoustic particles. The device 14 includes motion transducing sensors 16, 18 (geophones, accelerometers, etc.), that measure the motion of the object, or position measuring devices are located external to the object. Ideally, a pressure sensor 20 is also collocated with the motion sensing elements in the device in order to sample the medium at a single location. Each component of the velocity vector is separately multiplied by the pressure to produce components of the acoustic intensity vector.

By mathematically weighting the individual velocity vector measurements the response of the sensor can be steered. A conventional beam former can be constructed by summing the pressure with the weighted component velocities. For example, by mathematically weighting a single velocity vector component by 1 and the others by 0 the maximum response of the sensor can be steered in the direction of the velocity component measurement, and a null will be steered 180 degrees opposite. The mathematical null can be used to eliminate large interfering signals. Assuming adequate internal sensors and appropriate mechanical properties of the mounting hardware, the velocity sensor will be responsive to frequencies whose wavelength is greater than approximately ¼ the diameter of the velocity measurement device (Hydrophone for Measuring Particle Velocity 1956).

U.S. Pat. No. 8,638,956 discloses embodiments of an acoustic velocity microphone that include a sensor frame structure, a contact support means, and a buoyant object. The buoyant object is suspended in the sensor frame structure by the contact support means. The buoyant object receives three-dimensional movement of air excited by the acoustic wave. The three-dimensional movement that the buoyant object receives is detected using a detection means.

SUMMARY

An objective of the present disclosure is the provision of a method and apparatus for more accurately determining the acoustic intensity vector. Another objective is the provision of a method and apparatus for determining the acoustic intensity vector wherein the instantaneous acoustic particle velocity vector and acoustic pressure are measured at an object. Another objective is the provision of a method and apparatus for providing a non-contact support structure of the object for determining acoustic particle velocity vector and acoustic pressure. Another objective is the provision of a method and apparatus for determining the acoustic pressure and instantaneous acoustic particle velocity vector at the same point in space. These and other objectives will become apparent from the following description of the invention.

Aspects and embodiments are directed to an acoustic vector sensor having a non-contact support structure that removes the need for contact based mechanical mounts for the object of the sensor. Aspects and embodiments are directed to a non-contact support structure that provides for supporting forces of the object of the sensor to be adjusted dynamically and electronically. Aspects and embodiments are directed to an acoustic vector sensor that contains no sensors to transduce motion. Aspects and embodiments provide for pressure to be transduced at the same location of the object where the particle velocity is measured without the need for a separate pressure sensor collocated with the object.

An embodiment of an Acoustic Vector Sensor (AVS) includes an object suspended in the fluid medium by a non-contact support structure. The object and the non-contact support structure are configured so that the object moves in response to any disturbance of the fluid by an acoustic wave. The non-contact support structure comprises a plurality of solenoids that each produce a magnetic field in the fluid medium. A measurement device measures movement of the object. A processing device determines an acoustic intensity vector of the acoustic wave based on the measured movement of the object.

According to an embodiment, the AVS comprises three sets of solenoids, each set of solenoids disposed along one Cartesian coordinate axis with the object disposed at the origin therebetween.

According to an embodiment, the measurement device determines an increase in pressure at the object based on any measured movement of the object away from each solenoid of each pair of solenoids or a decrease in pressure at the object based on any measured movement of the object toward each solenoid of each pair of solenoids so as to thereby electrically measure the pressure change at the object.

According to an embodiment, the AVS comprises an excitation device that drives the plurality of solenoids with a drive signal, wherein the excitation device is configured to drive each pair of solenoids with an opposite phase current drive signal so that a magnetic well is generated that will oppose any change in position of the object at the origin.

According to an embodiment, the measurement device determines any change in inductance by measuring any change of an envelope of a drive voltage of the drive signal at each pair of solenoids that results from any movement of the object so as to thereby electrically transduce the object's motion.

According to an embodiment, each solenoid or each pair of solenoids is paired with a capacitor to provide an LC circuit, and wherein the measurement device measures a change in inductance by measuring a change in frequency of the drive signal at each pair of solenoids that results from any movement of the object so as to thereby electrically transduce the object's motion. According to an embodiment, the processing device determines three-dimensional movement of the object based on any change in the inductance and determines the acoustic intensity vector of the acoustic wave from the determined three-dimensional movement of the object.

According to an embodiment, the plurality of solenoids comprises a single solenoid disposed along each Cartesian coordinate axis of the object, wherein each solenoid provides a static field. According to an embodiment, the measurement device comprises at least one non-contact position measurement device that is separate from the single solenoid disposed along each Cartesian coordinate axis and wherein the processing hardware measures the position and adjusts a drive level of the static field provided by each solenoid to keep the object centered.

According to an embodiment, the object is coated with a conductive, non-ferrous material. According to an embodiment, the object is a sphere. According to an embodiment, the object has a size smaller than a wavelength of a highest frequency of an acoustic wave to be detected. According to an embodiment, the object is a hollow object.

According to an embodiment, the non-contact support structure comprises the magnetic field. According to an embodiment, the measurement device comprises an electromagnetic field detection device.

One embodiment of a method for determining an acoustic intensity vector of an acoustic wave, comprises suspending an object in a fluid with a magnetic a non-contact support structure comprising at least one solenoid placed on each Cartesian coordinate axis of the object and driving the at least one solenoid so that a magnetic field is provided to suspend the object in the fluid medium and so that object is configured to move in response to any disturbance of the fluid by an acoustic wave. The method further comprises measuring any disturbance of the object by the acoustic wave, and based on the measuring of any disturbance of the object, determining with a processing device an acoustic intensity vector of the acoustic wave.

According to an embodiment, suspending the object comprises providing three pairs of solenoids, each pair of solenoids disposed along one Cartesian coordinate axis with the object disposed at the origin therebetween, and further comprises driving each solenoid of each pair of solenoids with an opposite phase current drive signal so that a magnetic well is generated that will oppose any change in position of object at the origin between the pairs of solenoids. According to an embodiment, measuring any disturbance of the object comprises determining any change in inductance by measuring any change of an envelope of a drive voltage of the drive signal at each pair of solenoids that results from any movement of the object so as to thereby electrically transduce the object's motion.

According to an embodiment, the method comprises pairing each solenoid or each pair of solenoids with a capacitor to provide an LC circuit, and measuring a change in inductance by measuring a change in frequency of the drive signal at each solenoid that results from any movement of the object so as to thereby electrically transduce the object's motion.

According to an embodiment, suspending the object comprises providing a single solenoid disposed along each Cartesian coordinate axis of the object, each solenoid configured to provide a static field, and at least one non-contact position measurement device that is separate from the single solenoid disposed along each Cartesian coordinate axis. According to an embodiment, the drive level of the static field provided by each solenoid is adjusted to keep the object centered.

According to an embodiment, the method further comprises determining an increase in pressure at the object based on any measured movement of the object away from each solenoid of each pair of solenoids or a decrease in pressure at the object based on any measured movement of the object toward each solenoid of each pair of solenoids so as to thereby electrically measure the pressure change at the object.

According to an embodiment, the object is provided with a feature size that is smaller than a wavelength of the highest frequency of an acoustic wave to be measured. According to an embodiment, the object is a ¼ of a wavelength of the highest frequency to be measured. According to an embodiment, the object coated with a conductive, non-ferrous material.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

It is to be understood that the term fluid, is any medium that isn't a solid or a vacuum. In particular a fluid is any a substance that has no fixed shape and yields easily to external pressure, such as a gas or a liquid.

Aspect and embodiments of this disclosure provide a method and apparatus for eliminating any contact support structure of the object for determining acoustic particle velocity vector and pressure. Aspects and embodiments are directed to an acoustic vector sensor having a non-contact support structure that removes the need for contact based mechanical mounts for the object of the sensor, thereby eliminating the support structures impact on sensor performance in terms of resonances, damping, frequency dependent response, etc. Aspects and embodiments provide the non-contact support structure for supporting forces (magnetic levitation) of the object of the sensor to be adjusted dynamically and electronically. Aspects and embodiments allow for better use of analog to digital converter dynamic range of the acoustic vector sensor when the sensor is used in the presence of interfering acoustic signals by providing an additional damping force corresponding undesirable acoustic wave directions.

Aspects and embodiments are directed to an acoustic vector sensor that contains no sensors to transduce motion, thereby eliminating the need for complicated electronics. Aspects and embodiments provide for use of a symmetric object and without needing ballast to achieve a collocated center of gravity and center of mass of the object. Aspects and embodiments eliminate any need for wires to protrude from the object which impact directional sensitivity and produce flow noise. Aspects and embodiments provide for the object to be small in dimension so as to be therefore capable of transducing higher frequencies. Aspects and embodiments allow for easier control over the density of the object which is directly related to sensitivity.

Aspects and embodiments provide a novel method of transducing pressure which allows pressure to be transduced at the same location as where the particle velocity is measured without the need for a separate pressure sensor collocated with the object of the acoustic vector sensor. Aspects and embodiments eliminate the need for a remote pressure sensor. Aspects and embodiments minimize the separation distance between the object that is the basis for the acoustic velocity sensor and the pressure sensor.

A PU acoustic vector sensor was described above with respect to FIG. 1. For acoustic vector sensors of the PU variety utilizing a contact type compliantly suspended object, the suspension mechanism, i.e. the compliant springs, introduce non-idealities into the measurement such as frequency based damping of the motion, or non-uniform directional response. Further, for measurement devices or objects with integrated sensors 16, 18, 20, additional non-idealities are introduced from the protrusion of electrical cables and inaccurate position of the center of gravity and buoyancy.

Aspects and embodiments of the present disclosure provide for a neutrally buoyant magnetically levitated object where contact-based suspension is unnecessary. Aspect and embodiments provide for a magnetically levitated object that returns to a resting position when unperturbed by an acoustic wave. Aspects and embodiments provide a non-contact support structure that is a magnetic field, wherein the object is magnetically levitated.

Figure 2:
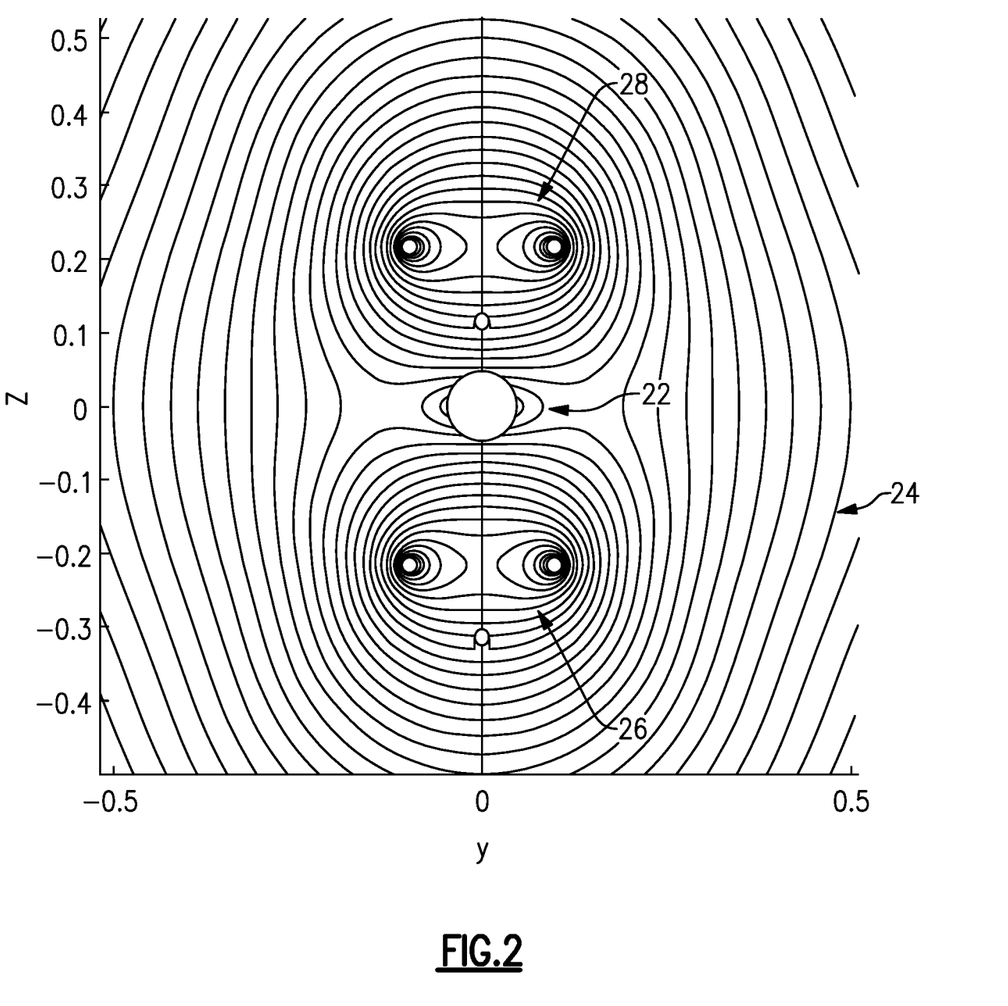
FIG. 2 illustrates a field diagram of suspending an object by a magnetic or electromagnetic field according to aspects and embodiments.

Referring to FIG. 2, there is illustrated a magnetic field diagram illustrating the non-contact support of a magnetically levitated object in the y-z plane. A magnetically levitated object 22 is supported in a resting position by a magnetic field (illustrated by magnetic field lines 24). According to aspects and embodiments disclosed herein, the magnetic field is generated by at least one solenoid. In the embodiment of FIG. 2, there are illustrated two solenoids 26, 28, with each solenoid being on one side of the object 22 along one Cartesian coordinate axis (the z-axis). Each solenoid is driven by a source to generate a magnetic field as represented by the magnetic field lines. According to aspects and embodiments, the solenoids are driven by an excitation device that drives the pair of solenoids with a drive signal, wherein the excitation device is configured to drive the pair of solenoids with an opposite phase current drive signal so that a magnetic well is generated that will oppose any change in position of the magnetically levitated object at center between the pair of solenoids. With this arrangement, the magnetically levitated object will move with the surrounding particles when the surrounding particles are perturbed by an acoustic wave, and the magnetically levitated object will return to its fixed (at rest) position when the surrounding particles are no longer disturbed by an acoustic wave. This non-contact support arrangement provides for electromagnetically levitating the object in order to allow its location to be perturbed by the motion of surrounding particles, which motion can be measured. As will discussed herein, there are numerous ways to accomplish this non-contact support by electromagnetic levitation. In addition, as discussed herein, numerous ways are provided to measure the motion of the magnetically levitated object.

For the embodiment of FIG. 2, where solenoids are placed on both sides of the magnetically levitated object 22, the object is conductive, but non-ferrous, and the pairs of solenoids are driven by sources with alternating current, each solenoid being driven out of phase with its complement solenoid. This configuration produces a magnetic field, as illustrated by the magnetic field lines, which is increasing in all directions from the center point between the solenoids. The AC field produces currents within the magnetically levitated object which in turn produces a magnetic field which counters the applied field provided by the solenoids. This repulsive force produced by the magnetically levitated object provides an at rest position of the magnetically levitated object at the center of the structure (of the magnetic field provided by the solenoids). In addition, the magnitude of the magnetic field controls the amount of restorative force produced and the amount that an acoustic wave can shift the magnetically levitated object from its at rest position. With this arrangement, the forces that suspend the object can be dynamically and electronically controlled. In addition, the inductance of the coils will change with the position and motion of the object. With this arrangement, the change in inductance due to change in position of the magnetically levitated object can be measured in order to determine motion of the object. In particular, the change in inductance in each coil corresponds to a change in position along a single axis corresponding to the axis of the coil pair.

Figure 3:
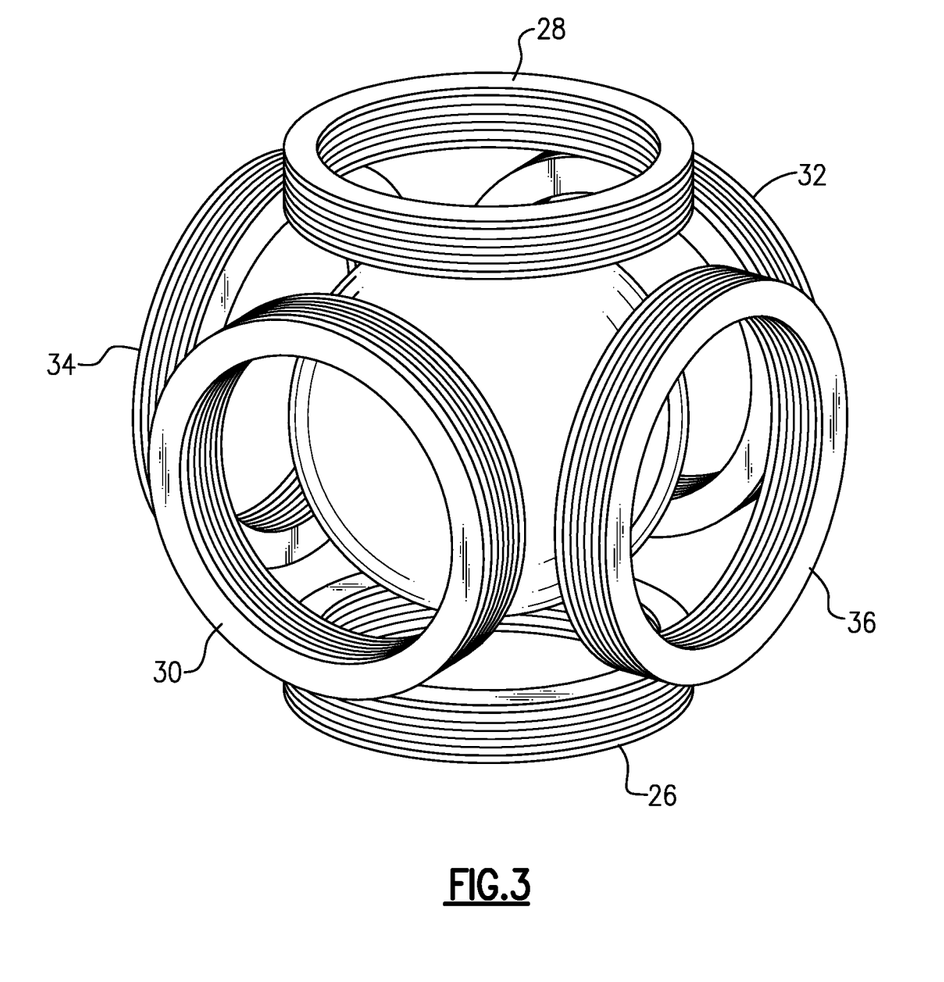
FIG. 3 illustrates aspects and an embodiment of a three-dimensional non-contact support structure for suspending an object.

Referring to FIG. 3, there is illustrated an embodiment including multiple solenoid pairs 26/28, 30/32, and 34/36, with each pair or set of solenoids disposed along one Cartesian coordinate axis with the magnetically levitated object disposed at the origin therebetween. This arrangement can be used to transduce multiple components of the acoustic particle velocity vector. Each of the coil pairs 26/28, 30/32, and 34/36 are driven with a drive signal from at least one AC source, with each solenoid being driven out of phase with its complement solenoid so that a magnetic well is generated that will oppose any change in position of the magnetically levitated object at the origin between the coil pairs 26/28, 30/32, and 34/36. A measurement device can be used to determine any change of an envelope of a drive voltage of the drive signal at each pair of solenoids required to produce the same current. The change of the drive voltage that results from any movement of the magnetically levitated object can be measured at each solenoid pair so as to thereby electrically transduce or determine the object's motion under the influence of an acoustic wave.

According to aspects and embodiments, the object is made of a compliant material coated with a conductive but non-ferrous material. Aluminum is an example material that the object can be made of if there is not a need for the object to be compliant. The coating can be any non-ferrous material that can be deposited or plated to a compliant object. One exemplary material is zinc.

According to aspects and embodiments, the object is a sphere. According to aspects and embodiments, the object has a size smaller than a wavelength of a highest frequency of an acoustic wave to be detected. A diameter, or a max feature size, of ¼ of the wavelength to be detected is appropriate. For a typical range of acoustic frequencies, 10 Hz-10 kHz, the acceptable diameters would range from approximately 37.5 meters to 3.75 centimeters, based on typical acoustic measurements in sea water. According to aspects and embodiments, the object is a hollow object.

According to aspects and embodiments, when the magnetically levitated object is placed in the pressure field of an acoustic wave the object will deform. According to aspects and embodiments, this deformation can be measured to measure the pressure at the magnetically levitated object. For example, the deformation of the magnetically levitated object will be seen as movement of the object either toward or away from both of the solenoids by measurement devices. These measurements can be used to determine pressure at the object.

According to aspects and embodiments, each of the solenoid pairs 26/28, 30/32, and 34/36 can be configured as an inductor (coil) of an LC resonator circuit. Each of the solenoid pairs is coupled with a capacitor to provide an LC circuit. Each solenoid pair is driven by an out of phase signal from an alternating-current (AC) source. In other words, each solenoid pair is configured as an LC resonator such that the magnetic field produced by each solenoid in a solenoid pair is out of phase with its opposite solenoid. With this arrangement, any change in the resonant frequency of the solenoid will denote a change in solenoid inductance. The change in the solenoid inductance can be measured and used to determine motion of the magnetically levitated object 22. Thus, a measurement device can be used to measure a change in inductance of each solenoid pair by measuring a change in frequency of the drive signal at each solenoid pair that results from any movement of the object so as to thereby electrically transduce the object's motion.

Figure 4:
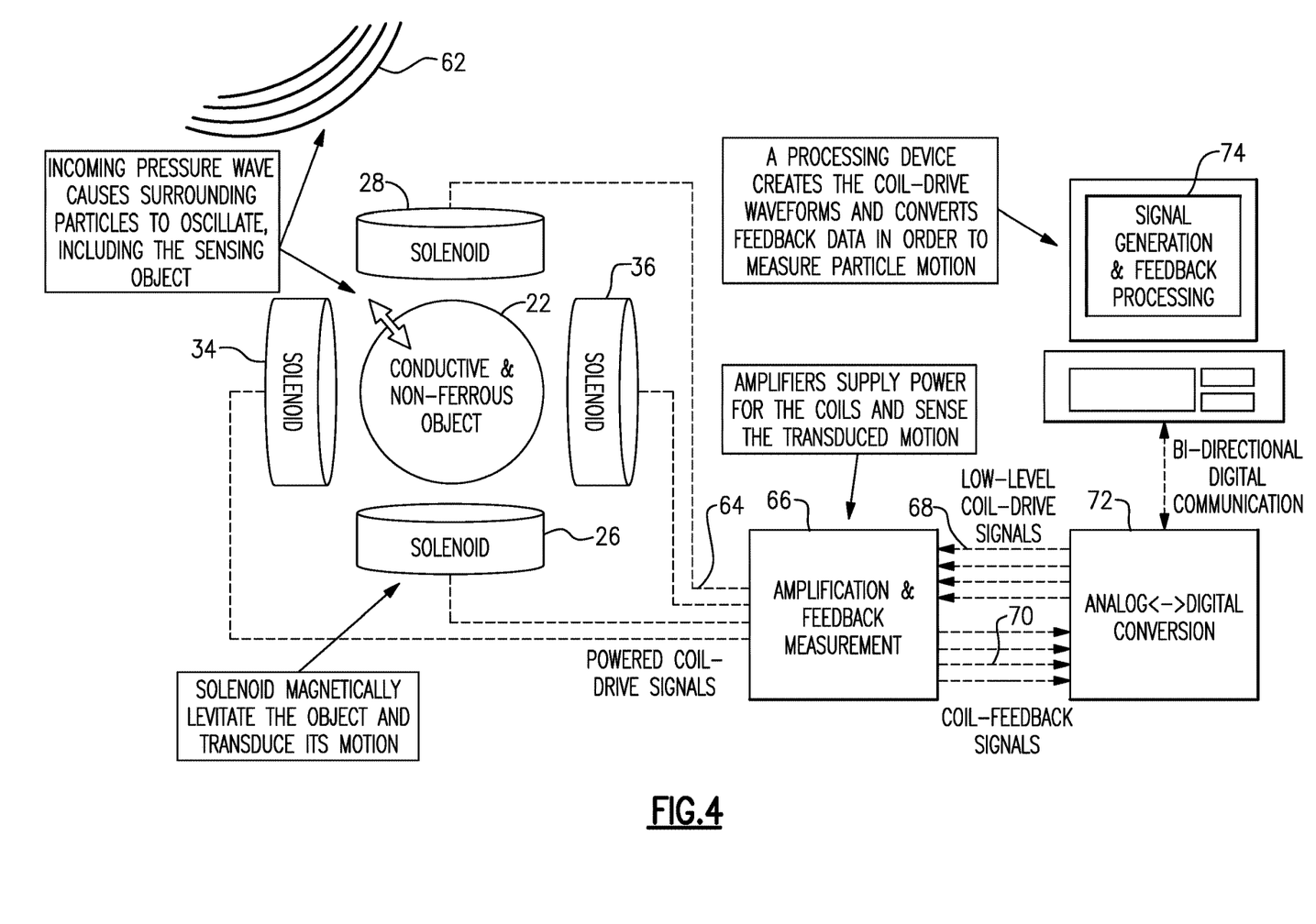
FIG. 4 illustrates aspects and an embodiment of an acoustic vector sensor measurement system.

FIG. 4 illustrates aspects and an embodiment of an acoustic vector sensor measurement system. The system includes multiple solenoid pairs 26/28, 30/32 (not illustrated), and 34/36, with each pair or set of solenoids disposed along one Cartesian coordinate axis with the magnetically levitated object 22 disposed at the origin therebetween. Operation of the system will now be described. An incoming pressure wave 62 causes surrounding particles to oscillate, including the sensing object 22. The Solenoid pairs are driven by a signals 64 to magnetically levitate the object 22, and any change in signals 64 are measured to transduce motion of the object 22. Block 66 comprises at least one or more amplifiers that amplify drive signals 68 to provide signals 64 to drive the solenoid pairs and also provides sensed signals 70 from the solenoid pairs that are provided to Analog-to-Digital and Digital-to-Analog converter 72. Analog-to-Digital and Digital-to-Analog converter 72 provides digitized signals 70 to processor 74 for processing to convert data into object position data in order to measure particle motion and to determine the Acoustic Intensity Vector. Processor 74 can also mathematically manipulates the information, for example to beam steer the measurement system. The processing device 74 also creates the low-level coil-drive waveforms 68 which are provided to the Digital-to-Analog converter 72 to provide the drive signals 68. With this arrangement, an apparatus for eliminating any contact support structure of the object 22 for determining acoustic particle velocity vector and pressure is provided. With this arrangement, the non-contact support structure removes the need for contact based mechanical mounts for the object of the sensor, thereby eliminating the support structures impact on sensor performance in terms of resonances, damping, frequency dependent response, etc. With this arrangement, the non-contact support structure provides for supporting forces (magnetic levitation) of the object of the sensor to be adjusted dynamically and electronically. This arrangement also provides for better use of analog to digital converter dynamic range of the acoustic vector sensor when the sensor is used in the presence of interfering acoustic signals by providing an additional damping force corresponding undesirable acoustic wave directions. This arrangement also provides an acoustic vector sensor system that contains no sensors to transduce motion, thereby eliminating the need for complicated electronics. This arrangement provides for use of a magnetically levitated symmetric object without needing ballast to achieve a collocated center of gravity and center of mass of the object. This arrangement provides also eliminates any need for wires to protrude from the object which impact directional sensitivity and produce flow noise. This arrangement provides for the object to be small in dimension so as to be therefore capable of transducing higher frequencies of an acoustic wave. This arrangement also provides for easier control over a density of the object which is directly related to sensitivity.

Figure 5:
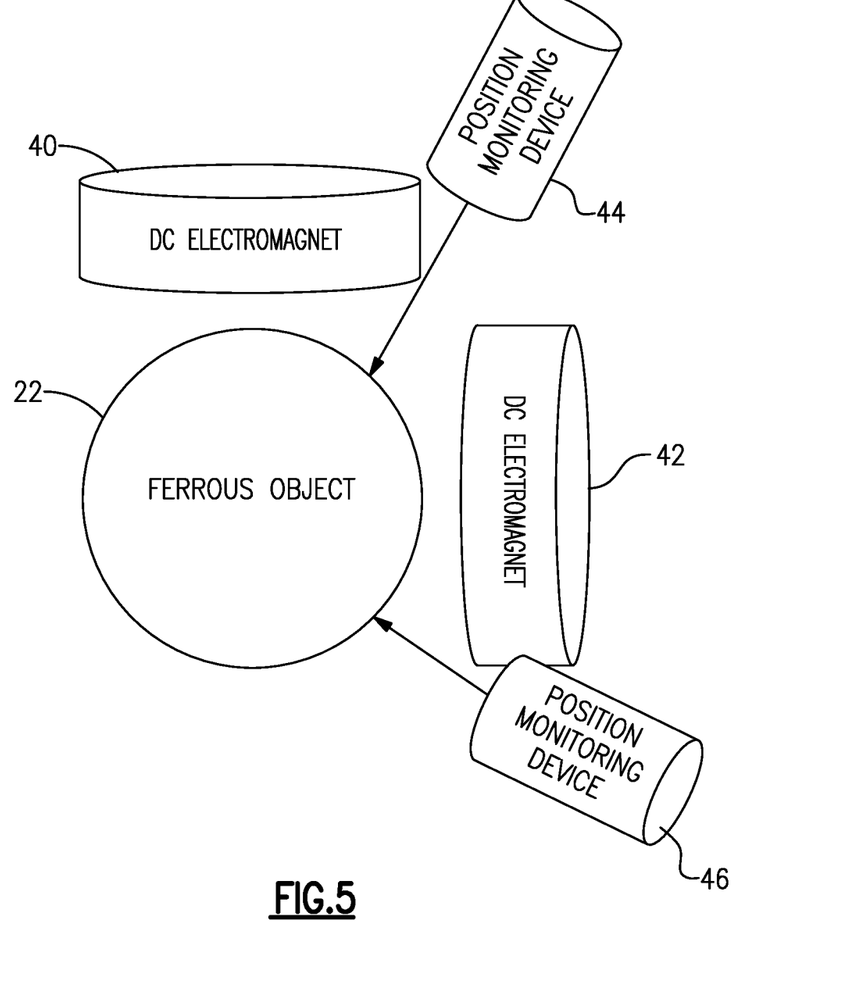
FIG. 5 illustrates aspects and an embodiment of an acoustic vector sensor.

Alternatively, referring to FIG. 5, there is illustrated a cross-sectional view of another embodiment. There is provided one solenoid 40, 42 on each cartesian coordinate (only two coordinates are illustrated in FIG. 5) on one side of the object 22. A single solenoid is disposed along each Cartesian coordinate axis of the object. Each solenoid is illustrated as a direct-current (DC) electromagnet. Each solenoid is driven by a DC source to provide a static field. Also illustrated is a separate measurement device for each DC electromagnet. With this arrangement, since there is no stable levitation configuration of permanent magnets separate position monitoring devices 44, 46 are used to measure the object's location. The separate measurement device comprises at least one non-contact position measurement device that is separate from the single solenoid disposed along each Cartesian coordinate axis that measures any change in movement of the object. With this arrangement, the measurement from each position monitoring device 44, 46 can be used to deduce the acoustic wave velocity. With this arrangement, the strength of each DC electromagnet can be adjusted in order to constrain the object's position to the center of the structure. With this arrangement, a processor receives the measured position from each of the measuring devices and adjusts a drive level of the static field provided by each solenoid to keep the object centered.

By way of example, three orthogonally placed laser-fiber vibrometers can be used to measures any change in movement of the object. Because the measurement is a vector quantity, three sets of the laser-fiber vibrometers may be needed so that the X, Y, Z components of the particle velocity of the acoustic wave may be respectively measured. Nevertheless, it is appreciated that for any of the embodiments disclosed herein only one or two measurement devices can be used to provide any dimension of measurements of the particle velocity of the acoustic wave. For this embodiment, one or two vibrometers may be used to measure a partial quantity of the particle velocity vector. If only one laser-fiber vibrometer is used, a single axis acoustic velocity vector sensor device is formed. If two laser-fiber vibrometers are used, a biaxial acoustic velocity vector sensor device is formed. For this arrangement, the object is made from a ferrous material.

It is also appreciated that the magnetically levitated objects as described herein can be placed in a two-dimensional (2D) array or three-dimensional (3D) array to provide 2D or 3D directional buoyant objects. It is to be appreciated that any of the embodiments the non-contact support structure and measurement devices as disclosed herein, can be used with a (2D) array or three-dimensional (3D) array to a multi-dimensional (2D or 3D) array formation so that an acoustic propagating field in a 2D plane or a 3D space may be measured.

Figure 6:
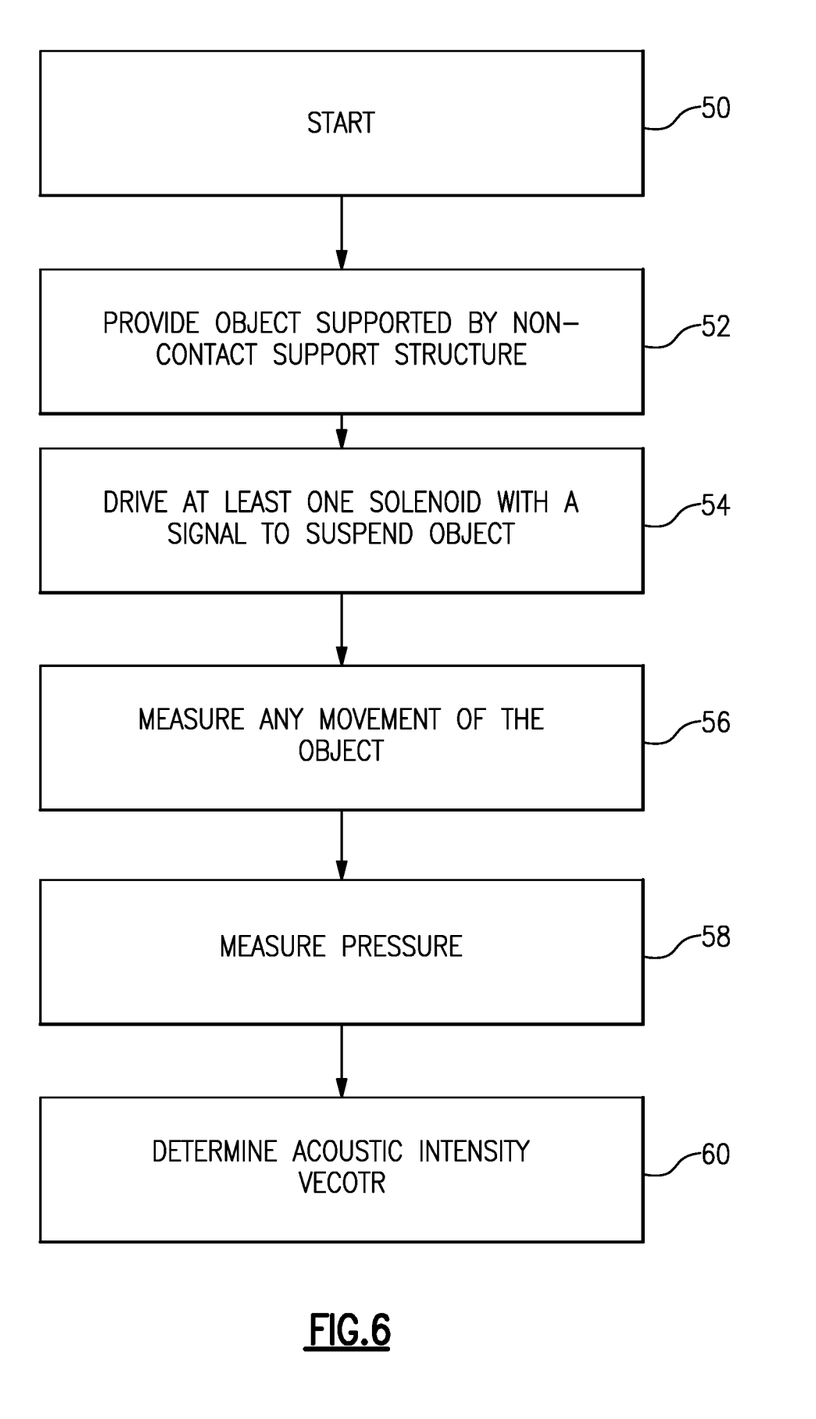
FIG. 6 illustrates aspects and an embodiment of a method for determining an acoustic intensity vector.

FIG. 6 is a flowchart showing a method 50 for determining an acoustic intensity vector of an acoustic wave in accordance with various embodiments. At step 52 of method 50, an object is provided with any of the embodiments of a non-contact support structure comprising at least one solenoid as detailed herein. At step 54 of method 50, the at least one solenoid of the support structure is driven by any of the drive signals (AC, DC) to suspend the object with a magnetic field. At step 56 of method 50, any signal change at the least one solenoid resulting from movement of the object due to an acoustic wave disturbance is measured according to any of the methodologies disclosed herein. At step 58 of method 50, the pressure at the object is measured using any of the methodologies disclosed herein, or by other methodologies and with other devices known to those of skill in the art. At step 58 of method 60, the acoustic intensity vector is derived or determined from the measurement of the movement of the object and the pressure measurement, as disclosed herein.

Figure 7:
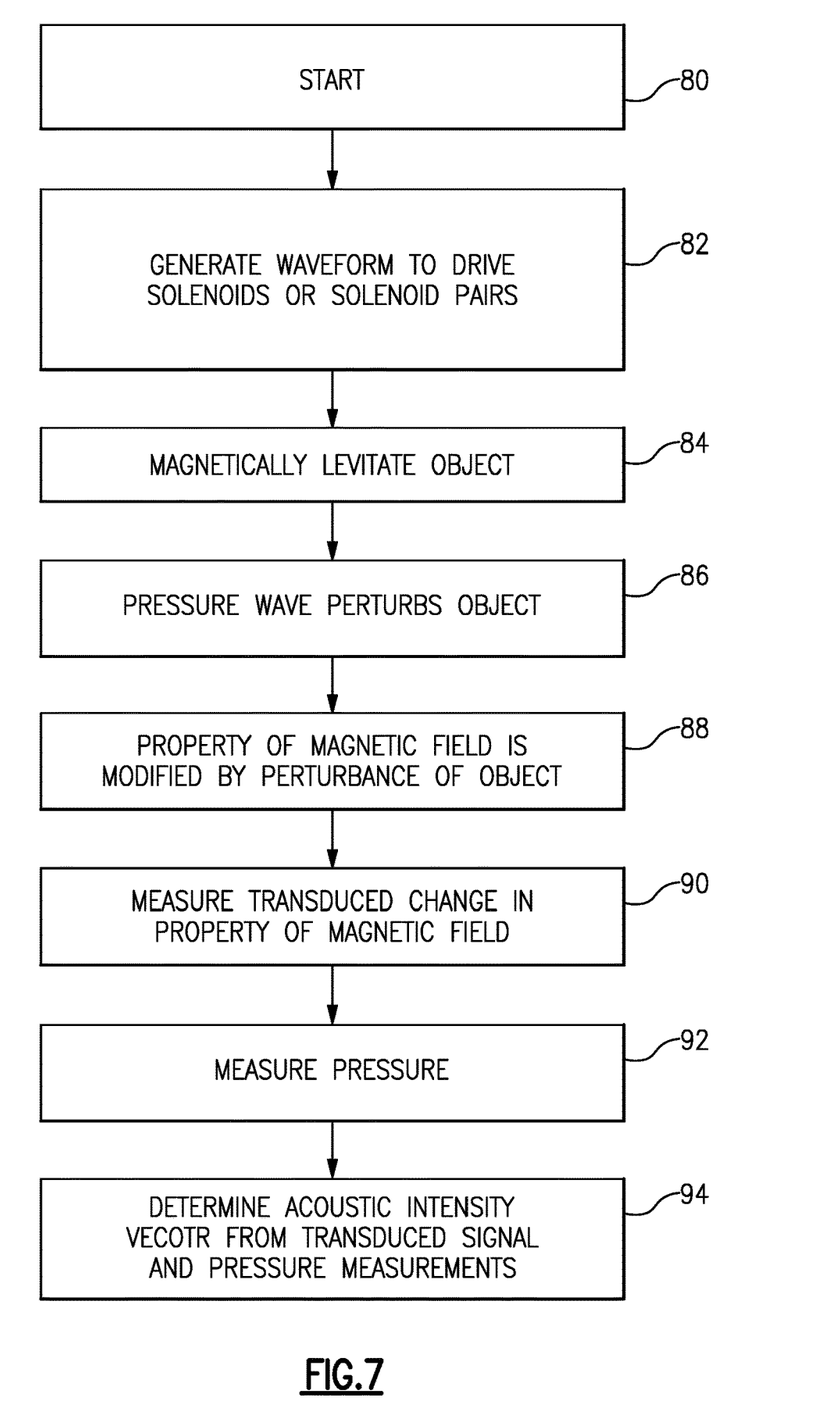
FIG. 7 illustrates another embodiment of a method for determining an acoustic intensity vector.

FIG. 7 is a flowchart showing another method 80 for determining an acoustic intensity vector of an acoustic wave in accordance with various embodiments. At step 82 of method 80, at least one waveform is generated to drive at least one solenoid or at least one pair of solenoids of a non-contact support structure. The waveform can by any drive signals (AC, DC) that suspend the object with a magnetic field. As a result of driving at least one solenoid or at least one pair of solenoids, at step 84 of method 80 the object is levitated by a magnetic field. At step 86 of method 80, an acoustic pressure wave to be measured perturbs the object. At step 88 of method 80, at least one property of the magnetic field suspending the object is changed as a result of the perturbance and movement of the object by the magnetic field. At step 90 of method 80, any signal change resulting from movement of the object due to an acoustic wave disturbance is measured according to any of the methodologies disclosed herein. At step 92 of method 80, the pressure at the object is measured using any of the methodologies disclosed herein, or by other methodologies and with other devices known to those of skill in the art. At step 94 of method 80, the movement of the object is derived from the change in the at least one signal property. In addition, the acoustic intensity vector is derived or determined from the determined movement of the object and the pressure measurement, as disclosed herein.

Aspects and embodiments of the method include providing three pairs of solenoids, each pair of solenoids disposed along one Cartesian coordinate axis with the object disposed at the origin therebetween. Aspects and embodiments of the method include further comprise driving each solenoid of each pair of solenoids with an opposite phase current drive signal so that a magnetic well is generated that will oppose any change in position of object at the origin between the pairs of solenoids.

Aspects and embodiments of the method include measuring any disturbance of the object by determining any change in inductance by measuring any change of an envelope of a drive voltage of the drive signal at each pair of solenoids that results from any movement of the object so as to thereby electrically transduce the object's motion.

Aspects and embodiments of the method include pairing each solenoid with a capacitor to provide an LC circuit and exciting each solenoid with an AC signal. Aspects and embodiments of the method also include measuring a change in inductance at each solenoid by measuring a change in frequency of the drive signal at each solenoid that results from any movement of the object so as to thereby electrically transduce the object's motion.

Aspects and embodiments of the method include suspending the object by providing a single solenoid disposed along each Cartesian coordinate axis of the object, each solenoid configured to provide a static field, and at least one non-contact position measurement device that is separate from the single solenoid disposed along each Cartesian coordinate axis. In addition, aspects and embodiments of the method include adjusting a drive level of the static field provided by each solenoid to keep the object centered.

Aspects and embodiments of the method include further comprise determining an increase in pressure at the object based on any measured movement of the object away from each solenoid of each pair of solenoids or a decrease in pressure at the object based on any measured movement of the object toward each solenoid of each pair of solenoids so as to thereby electrically measure the pressure change at the object. Aspects and embodiments provide a novel method of transducing pressure which allows pressure to be transduced at the same location as where the particle velocity is measured without the need for a separate pressure sensor collocated with the object of the acoustic vector sensor. Aspects and embodiments eliminate the need for a remote pressure sensor. Aspects and embodiments minimize the separation distance between the object that is the basis for the acoustic velocity sensor and the pressure sensor.

Aspects and embodiments of the method include providing the object with a feature size that is smaller than a wavelength of the highest frequency of an acoustic wave to be measured. Aspects and embodiments of the method include providing the object coated with a conductive, non-ferrous material.

Aspects and embodiments of the method include providing two or more acoustic vector sensors in a multi-dimensional array. Each directional acoustic sensor of the two or more directional acoustic sensors includes a non-contact support means and an object. each object is suspended by the non-contact support structure. Each object has a feature size smaller than a wavelength of the highest frequency of an acoustic wave in a fluid. Each object receives the three-dimensional movement of the particles excited by the acoustic wave. The disturbance of each object is measured so as to multi-dimensional acoustic intensity vector.

Although the acoustic vector sensor has been described in connection with specific aspects and embodiments thereof, it will be appreciated that various modifications other than those discussed above may be resorted to without departing from the spirit or scope of the disclosure. For example, the buoyant object can be made in many forms, can be solid, and the like. The measurement of the change of inductance can be done by any technique known by those of skill in the art. The determination of the acoustic intensity vector can be accomplished by an computation or methodology known to those of skill in the art. The measurement of pressure can be done by an technique known to those of skill in the art. The separate position measurement can be done by optical detection can or by any other technique known to those of skill in the art. All these are without departing from the spirit or scope of the invention as defined in the following claims Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An Acoustic Vector Sensor (AVS), comprising
a non-contact support structure comprising a plurality of solenoids that each produce a magnetic field in a fluid medium; and
an object suspended in the fluid medium by the non-contact support structure, wherein the object and the non-contact support structure are configured so that the object moves in response to any disturbance of the fluid by an acoustic wave;
a measurement device that measures movement of the object; and
a processing device that determines an acoustic intensity vector of the acoustic wave based on the measured movement of the object;
wherein the plurality of solenoids comprises a single solenoid disposed along each Cartesian coordinate axis of the object, wherein each solenoid provides a static magnetic field.

2. The AVS of claim 1, wherein the measurement device comprises at least one non-contact position measurement device that is separate from the single solenoid disposed along each Cartesian coordinate axis and wherein the processing hardware measures the position and adjusts a drive level of the static field provided by each solenoid to keep the object centered.

3. The AVS of claim 1, wherein the measurement device determines an increase in pressure at the object based on any measured movement of the object away from each solenoid or a decrease in pressure at the object based on any measured movement of the object toward each solenoid so as to thereby electrically measure the pressure change at the object.

4. The AVS of claim 1, wherein the object is coated with a conductive, non-ferrous material.

5. The AVS of claim 4, wherein the object is a sphere.

6. The AVS of claim 4, wherein the object has a size smaller than a wavelength of a highest frequency of an acoustic wave to be detected.

7. The AVS of claim 4, wherein the object is a hollow object.

8. The AVS of claim 1, wherein the non-contact support structure comprises the magnetic field.

9. The AVS of claim 1, wherein the measurement device comprises an electromagnetic field detection device.

10. A method for determining an acoustic intensity vector of an acoustic wave, the method comprising:
suspending an object in a fluid with a magnetic a non-contact support structure comprising a single solenoid disposed along each Cartesian coordinate axis of the object, wherein each solenoid provides a static magnetic field;
driving the at least one solenoid so that the static magnetic field is provided to suspend the object in the fluid medium and so that object is configured to move in response to any disturbance of the fluid by an acoustic wave;
measuring any disturbance of the object by the acoustic wave; and
based on the measuring of any disturbance of the object, determining with a processing device an acoustic intensity vector of the acoustic wave.

11. The method of determining an acoustic intensity vector of an acoustic wave of claim 10, wherein measuring any disturbance of the object comprises determining any change in inductance by measuring any change of an envelope of a drive voltage of the drive signal at each solenoid that results from any movement of the object so as to thereby electrically transduce the object's motion.

12. The method of determining an acoustic intensity vector of an acoustic wave of claim 10, further comprising providing at least one non-contact position measurement device that is separate from the single solenoid disposed along each Cartesian coordinate axis.

13. The method of determining an acoustic intensity vector of an acoustic wave of claim 12, further comprising adjusting a drive level of the static field provided by each solenoid to keep the object centered.

14. The method of determining an acoustic intensity vector of an acoustic wave of claim 10, further comprising determining an increase in pressure at the object based on any measured movement of the object away from each solenoid or a decrease in pressure at the object based on any measured movement of the object toward each solenoid so as to thereby electrically measure the pressure change at the object.

15. The method of determining an acoustic intensity vector of an acoustic wave of claim 10, further comprising providing the object with a feature size that is smaller than a wavelength of the highest frequency of an acoustic wave to be measured.

16. The method of determining an acoustic intensity vector of an acoustic wave of claim 10, further comprising providing the object coated with a conductive, non-ferrous material.

\* \* \* \* \*